March 11, 1969 W. A. REIMER 3,432,796

MULTIPLANAR ELECTRICAL CONNECTION TECHNIQUES

Filed Dec. 14, 1966 Sheet 1 of 4

INVENTOR.
WILLIAM A. REIMER

BY Spencer E. Olson

ATTY.

3,432,796

MULTIPLANAR ELECTRICAL CONNECTION TECHNIQUES

William A. Reimer, Wheaton, Ill., assignor to Automatic Electric Laboratories, Inc., a corporation of Delaware Filed Dec. 14, 1966, Ser. No. 601,724

U.S. Cl. 339—18 8 Claims

Int. Cl. H01r *13/50;* H05k *1/04, 1/14*

ABSTRACT OF THE DISCLOSURE

A separable multiplanar printed circuit structure having a plurality of printed circuit boards stacked together on a frame and aligned to provide a stepped edge along which the terminals of the printed circuits on all the levels of the stack are exposed. A connector having a stepped inner surface shaped to conform with the stepped edge of the stack has spring contacts which mate with the exposed terminals to provide the desired connections to the circuits in the multilayer structure.

This invention relates to multiplanar electrical connection techniques and more particularly to a stack of substrate mounted circuits and a multiplanar connector for use with the stack and to assemblies thereof.

In the design of electronic computer or switching systems, there has been a trend toward developing standardized electrical circuits to simplify assembly and service of the systems and to reduce inventory "spare parts." Standardization of electrical circuits has been accomplished by manufacturing a relatively small number of substrate mounted circuit assemblies each having a different circuit arrangement. The individual circuits are manufactured economically in large numbers by mass production techniques and then various electrical networks are assembled by interconnecting different ones of the circuit sub-assemblies.

Ordinarily when the sub-assemblies are laminated together to form a composite multilayer circuit structure, electrical access to the circuits on the various layers of the multilayer structure is provided by terminating all the circuits in the assembly along one of the perimeters of the uppermost substrate in the structure and employing an edge connector adapted for plug-in reception of the multilayer structure. The terminals of each circuit are extended to the perimeter of the stack by means of circular-shaped solder-plated or copper-plated holes and printed conductors formed in the structure. Since connections to the circuits are made internal to the stack, there is no way to guarantee a reliable connection to each terminal and bad connections are difficult to detect.

Obviously, laminated circuit assemblies do not lend themselves readily to alteration and generally, whenever a change is required, the complete assembly is replaced. If the substrate were not laminated together, the edge connectors of the prior art would not be suitable to provide connections to external circuits because the substrates would tend to bend and fold whenever an attempt was made to plug them into the connector.

In contrast, the present invention provides a circuit assembly that is mechanically alterable. Furthermore, by means of a simple electrical connector assembly, positive metallic connection is assured between the required circuit terminals of each sub-assembly without damage to the substrates.

The present invention provides means for stacking a plurality of circuit sub-assemblies, each carried on its own substrate, in such a way as to expose on respective layers the terminals of the circuits along an edge of the stack. According to this invention, the substrates and the circuits they carry can be both mechanically and electrically separate from one another within the stack unlike multilayer printed circuit boards, and, rather than having the terminals of the circuits existing on the inner layers of the stack extended to the upper layer, connections are made to the circuits on a layer basis by means of a novel edge connector assembly.

Accordingly, it is a primary object of the invention to provide new and improved apparatus for making electrical connections to circuits disposed on all of the layers of a stack of insulating members.

It is another object of the invention to provide a connector assembly for use with a stack of substrate mounted circuits wherein electrical access to the circuits is provided on each respective level.

It is another object of the invention to provide a multiplanar connector assembly having self-aligning contacts which insure positive metallic conduction between the contacts and the circuit terminals which they contact.

It is another object of the invention to provide a multiplanar connector assembly that is capable of conforming to the shape of an edge of a stack of circuit bearing substrates to provide electrical access to electrical circuits disposed therewithin.

It is yet another object of the invention to provide improved electrical circuit connecting means especially suited for use with a plurality of thin removably mounted circuit bearing substrates.

Briefly then according to the invention, a stack of thin circuit bearing substrates has an edge that is stepped in a direction perpendicular to the planes of the substrates exposing a portion of each substrate on its respective level in the stack to provide electrical access to the terminals of circuits disposed on each level in the stack. The substrates are removably mounted on a frame which aligns the substrates to insure the formation of the stepped edge and to support the edge. An edge connector assembly including contact springs is aligned to and mounted on the frame in overlying relation with the stepped edge. The connector has an inner stepped surface conforming in shape to the configuration of the stepped edge of the stack. The contact springs which are attached to the inner surface of the connector mate with the circuit terminals exposed on the various levels at the edge of the stack. When assembled, the stepped edge of the stack and the terminals carried thereon are held between the frame and the contact springs whereby reliable electrical connections are made between the electrical circuits and the contact springs.

Other objects and features of the invention will become apparent and the invention will be better understood from the following description taken in conjunction with the accompanying drawings, in which.

Figure 1:
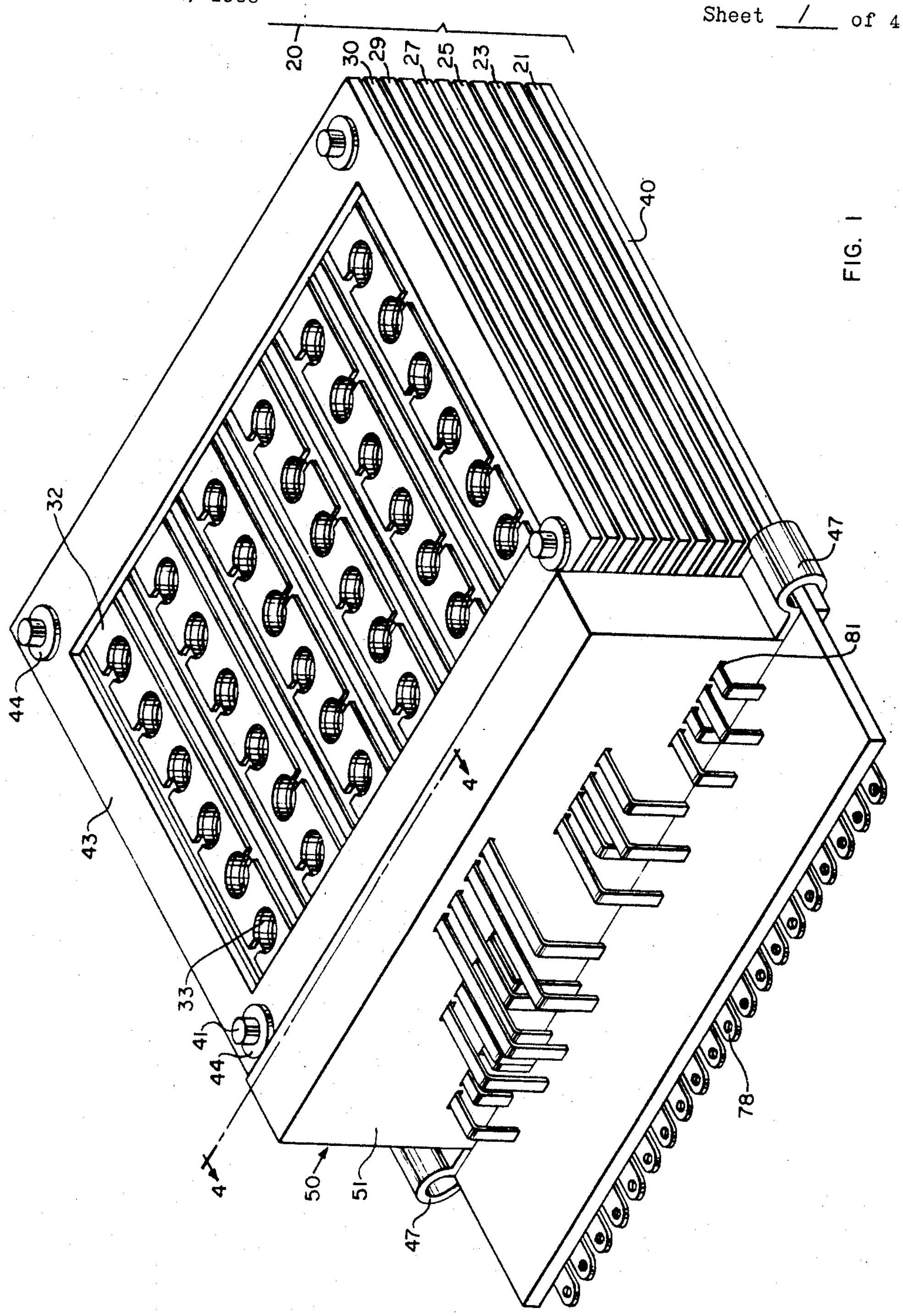
FIG. 1 is an isometric view of an electrical assembly, according to the invention, comprising a connector and a stack of substrate mounted circuits.

Referring now to illustrated preferred embodiments of the invention, FIG. 1 shows an electrical circuit assembly which includes a stack of electrical circuit bearing substrates 20, a frame 40 upon which the substrates are ıounted, and an edge connector assembly 50 which pro-ides connections to the electrical circuits disposed at arious levels in the stack. This stack may be used, for xample, in a mechanically alterable solenoid array mem-ıry system such as the one described in the application of . M. Donnelly et al., Ser. No. 379,941 filed July 2, 1964, vherein sixty-four conductor bearing substrates are used o code a mechanically alterable memory. By way of ex-ımple, stack 20 includes only ten substrates 21 to 30 of a suitable electrical insulating material, for example, Mylar ır ceramic approximately .005 inch to .020 inch thick; ıowever, the number of substrates used and the type of circuits carried by the substrates depend on the particular application and the circuits may comprise only conductors or also include components such as resistors, capacitors, diodes, transistors or the like.

The substrates have a plurality of aligned apertures 33, which are adapted to receive a corresponding plurality of elongated tubular solenoids as described and shown in the above-cited application. Each data plane comprises a Mylar substrate which carries a printed copper conductor 32. The conductor has loop portions which partially encircle the solenoid accepting apertures 33 in either clockwise or counterclockwise direction. Both ends of the conductor terminate at the same edge of the substrate to facilitate connections by means of the edge connector assembly 50.

The substrates are separably stacked together on a frame 40 made of phenolic and having substrate locator studs 41 formed integrally therewith. Part of the fabrication on each substrate is the perforation of a locator hole 42, such as the one shown in FIG. 3, in each corner so that the substrates are accurately indexed when placed on the studs. When all the substrates are mounted on the frame, a phenolic cover plate 43 is slipped over the studs and held in place by O rings 44. The connector assembly is indexed to the frame by pins 45, formed integrally with the frame 40 shown in FIG. 2, received in apertures 46 on the bottom of the connector body 51 and is clamped to it by suitable means such as clips 47.

When stacked on the frame the substrates are not mechanically connected to one another within the stack itself, and furthermore, the electrical circuits on each substrate are electrically insulated, internally of the stack, from the circuits on the other substrates of the stack so that a circuit on any level in the stack may be changed by merely removing the cover plate 43, disassembling the stack to the level at which the change is to be made and removing and replacing the substrate on which the circuit change is desired.

Figure 3:
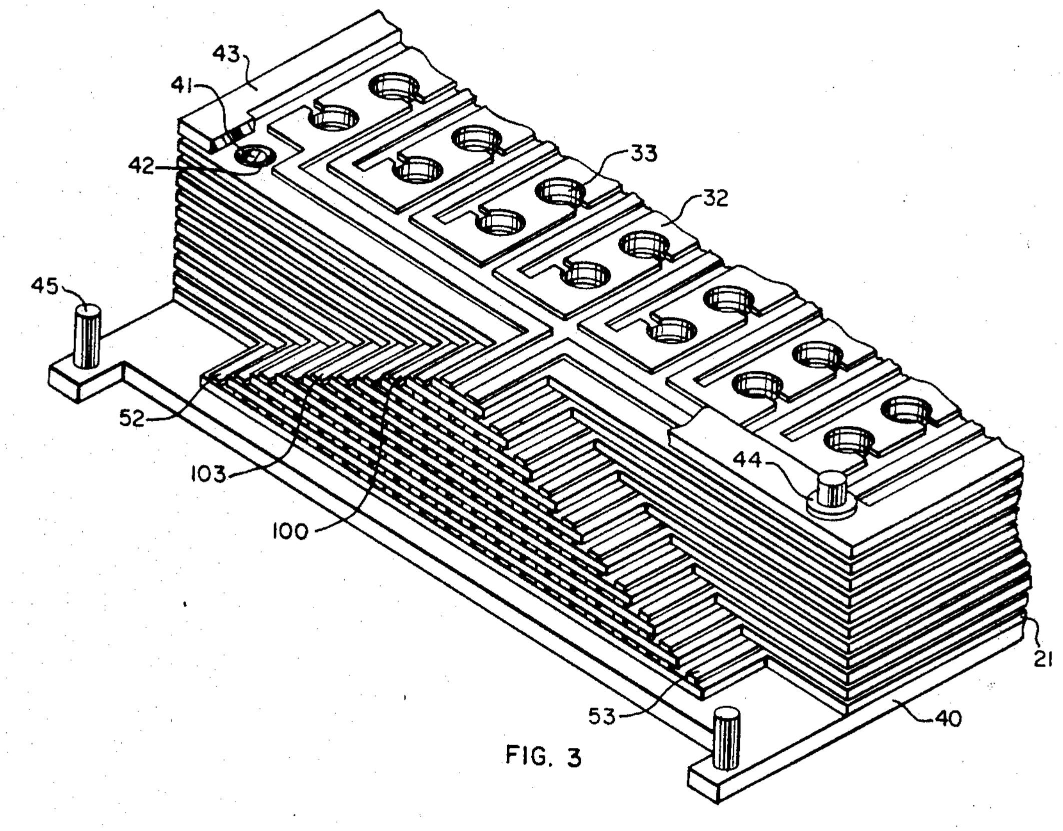
FIG. 3 is an isometric view of part of the stack showing the details of the stepped edge.

FIG. 3 shows how one edge of the stack, which is adapted to receive a connector, is stepped along the length of the stack and in a direction perpendicular to the planes of the substrates so that the terminals such as 52 and 53 of the circuits carried by the substrate 21 are exposed on respective levels. During the fabrication process, predetermined portions have been removed from the edge of each substrate on which circuits terminate so that when the substrates are stacked together on the frame with the modified edges of each substrate, including the terminals, aligned, external to the main body of the stack, the stack has a stepped configuration with the underlying substrates which are slightly longer than the overlying substrates supporting the narrower overlying substrate edges. The frame provides additional support for all the substrate edges. While the edge of the stack is shown in a preferred embodiment to have a substantially triangular, stepped cross-section in a plane parallel to the edge, it should be apparent that various other geometric configurations would serve as well.

Figure 2:
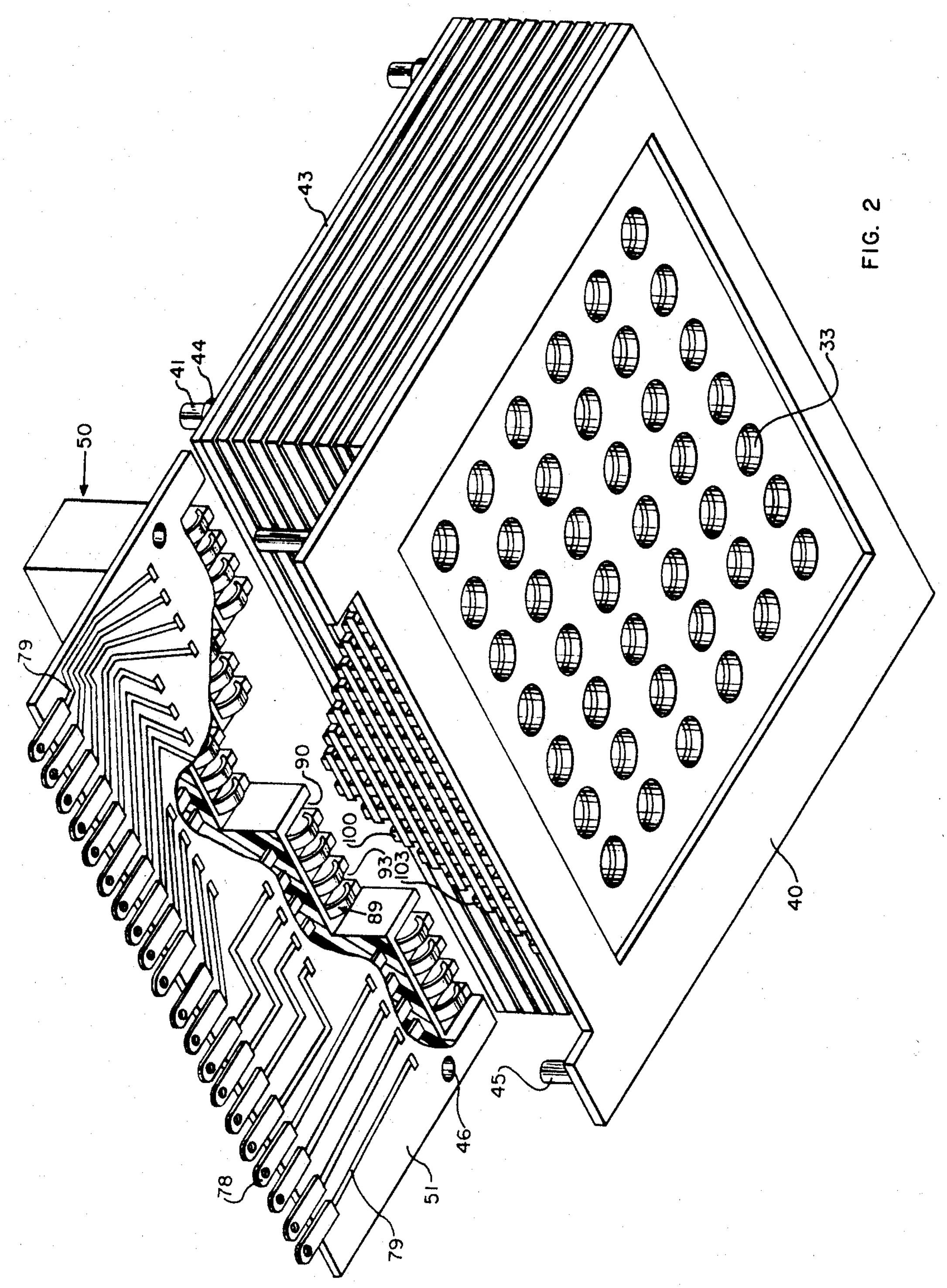
FIG. 2 is an isometric view of the assembly of FIG. 1 with the connector removed to show the relationship between the stepped edge of the stack and the inner stepped surface of the connector.

FIG. 2 shows how the connector assembly substantially conforms to the shape of the stepped-edge of the stack of substrates. The connector body 51, which is made of insulating material, has an inner stepped surface with four slots, such as 90–93, formed in each step. Spring contacts 86–89 are mounted in the slots 90–93. The number of slots and contact springs corresponds to the number of conductor terminals exposed on the stack edge. When the connector assembly is referenced to the frame by way of pins 45, each slot is aligned to oppose a corresponding terminal. The number of steps and slots shown is merely by way of example and in order to simplify the drawings. Furthermore, some of the dimensions of the drawing have been exaggerated for purposes of clarity.

Figure 4:
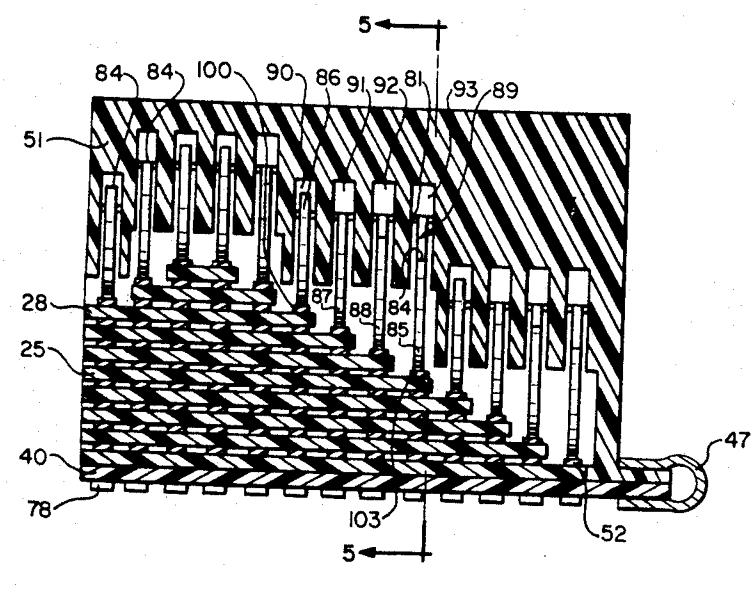
FIG. 4 is a partial sectional view of the connector and the stack taken along line 4—4 of FIG. 1.

In FIG. 4, it can be seen that a single step of the connector body accommodates four steps of the stack. The slots 90–93 which are formed in one step are aligned with conductors 100–103 disposed separately on the four steps of the stack formed by the modified edges of substrates 25–28. The connector body does not conform exactly to the shape of the stepped edge of the stack; however, the contacts are adapted to adjust themselves to the slight difference in height existing between the substrates and the connector body for all of the connections made by the contacts disposed on a single step of the connector body. Hence, conductor 100 on substrate 28 which opposes slot 90 is closer to the connector body than is conductor 103 on substrate 25 which opposes slot 93 in the same connector step.

Figure 5:
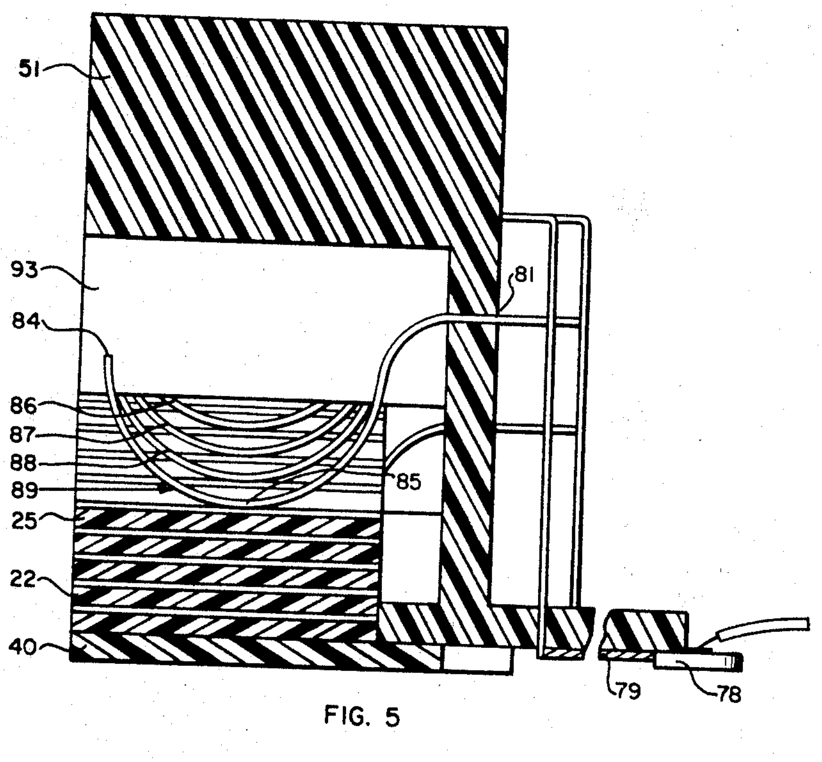
FIG. 5 is a partial sectional view of the connector and the stack taken along line 5—5 of FIG. 4.
Figure 6:
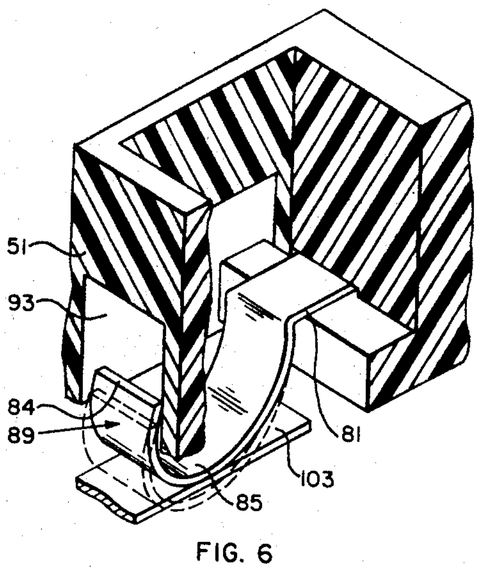
FIG. 6 is an enlarged partial sectional view of one of the connector slots.

The details of the spring construction and mounting are shown in FIGS. 5 and 6. Each contact spring, such as 89 in slot 93, is mounted at one end 81 on the connector body in cantilever fashion and extends into the slot with the other free end 84 movable within the slot. The free end is always positioned within the slot as can be seen in FIG. 6 where the spring is shown in both the operated mode (heavy lines) and at rest (phantom lines). This positioning insures that the spring will be aligned with a corresponding circuit terminal and will travel within the slot rather than being bent or damaged in some other way as the contact spring engages the terminal of conductor 103 when the connector is mounted on the substrates.

Contact to the terminal of conductor 103 is made by a bowed portion 85 of the contact spring which is formed integrally with the contact spring near its free end 84. Regardless of which layer the spring is in contact with, the bowed portion 85 projects away from the connector body and beyond the slot. The resiliency of the contact spring coupled with the cantilever mounting arrangement assures a positive metallic connection between the circuit terminals and the spring contacts.

FIG. 4 shows how contact springs 86–89 each travel a different distance within corresponding slots 90–93 to compensate for the differences in height between the levels of stack formed by the modified edges of substrates 25–28. More specifically, contact spring 86 has travelled further into slot 90 than has contact spring 87 in slot 91 etc. The springs on each step are mounted in identical fashion so that the connector can conform to a number of different stack-edge configurations. The contact springs terminate in the base of the connector and are extended to suitable terminals 78 by means of printed conductors 79.

Referring now to FIG. 2, for assembly, the individual substrates 21–30 are first aligned on the frame 40 by studs 41 to insure that the conductors exposed are positioned correctly relative to the frame and cover plate 43 is locked in position by the O rings 44.

The connector 50 is aligned with the frame by pins 45 and, consequently, to the stepped edge of the stack and the exposed conductor terminals so that the contact springs will mate with these terminals. The connector is locked to the frame by clips 47. When the connector is in place, it overlies the stepped edge of the stack and the substrates and the terminals thereon are compressed between the resilient spring contacts and the portion of the frame which supports the substrate edges thereby insuring positive electrical connections.

From the foregoing, it is seen that applicant has provided a stack of substrate mounted circuits having a stepped edge whereby electrical access is provided for the circuits on their respective levels in the stack. The substrates are electrically and mechanically separate from one another within the stack so that the content of the stack can be changed to include different circuits. Applicant has also provided a multiplanar connector for accessing the circuits in the stack on a layer basis. The connector contacts are adapted to compensate for differences in height between the body of the connector and the stepped edge of the stack, and consequently, the connector can be used for various stack-edge configurations without modification.

While the conductor bearing substrates have been described with reference to a preferred embodiment, that is, for use in coding a memory system, it should be apparent that the substrates can also carry electrical circuits that include components such as resistors, capacitors, semiconductors and the like, as well as conductors. The required circuit terminals are extended to the stepped edge of the stack in the manner described above and exposed on respective levels to provide electrical access to these circuits for the edge-connector assembly. Furthermore, various changes and modifications of the connector assembly could be made without departing from the spirit of the invention. It is intended therefore, that the invention not be limited to what has been shown and described except as such limitations appear in the appended claims.

What is claimed is:

1. An assembly comprising: a stack including a plurality of thin insulating substrates each having an electrical circuit disposed on a planar surface thereof, said stack having an edge stepped in a direction perpendicular to the planes of said substrates to expose, externally of said stack, a portion of each said substrate on its respective level in the stack, with a portion of each said circuit extending onto the exposed portion of a respective substrate; and a connector including a body of insulating material having an inner stepped surface substantially conforming in shape to the configuration of the stepped edge of the stack and a plurality of spring contacts secured to the stepped inner surface of said connector body, said connector being mounted on said stack and in overlying relation with said stepped edge whereby said contact springs engage the exposed portions of said circuits at said respective levels in the stack.

2. An assembly comprising: a frame; a stack including a plurality of thin insulating substrates removably mounted on said frame and each having an electrical circuit, including conductors, disposed on a planar surface thereof, said stack having an edge stepped in a direction perpendicular to the planes of said substrates to expose, externally of said stack, a portion of each said substrate on its respective level in the stack with a portion of each said conductor extending onto the exposed portion of the respective substrate; a connector body of insulating material attached to said frame in overlying relationship with the stepped edge of said stack, said connector body having a stepped inner surface substantially conforming in shape to the configuration of the stepped edge of the stack; and contact means disposed on said stepped inner surface of said connector body contacting said conductors at said different levels in the stack.

3. An assembly as claimed in claim 2, wherein there are provided on each step of the stepped inner surface a plurality of slots corresponding in number to the conductors on said stepped edge of said stack, said slots being positioned so as to oppose a corresponding one of sa conductors.

4. An assembly as claimed in claim 3, wherein sa contact means comprise a plurality of spring contac corresponding to said plurality of slots, said contacts bei mounted on said connector body adjacent said slots, ea said spring contact having a free end extending into corresponding slot and movable therewithin whereby sa contact spring is aligned on the corresponding step, an each said spring having a contact portion adjacent sai free end, said contact portion being bowed away fro said corresponding step and extending beyond said sl contacting the conductor opposed thereto.

5. An assembly as claimed in claim 4, wherein sai stepped inner surface provides a single step for each o a plurality of steps of the stepped edge of the stac whereby the conductors disposed on a first plurality o said steps of said edge are spaced apart a different dis tance from the respective step of the inner surface o said connector body, and wherein the free ends of th contact springs mounted on one of said steps of sai stepped inner surface, upon engagement with opposin ones of said conductors on said substrates, each travel a distance within their corresponding slots that correspon to said differences in spacings between said conductor and the inner surfaces of said connector body, so as to compensate for said differences in spacings.

6. An assembly as claimed in claim 5, wherein the electrical circuit on each substrate is electrically insulated, internally of the stack, from the circuits on the other substrates of the stack.

7. An assembly comprising; a plurality of thin insulating substrates, each having a terminal portion, separably stacked together, with the terminal portions extending from the main body of the stack at one edge thereof and being of decreasing lengths in a direction perpendicular to the planar extent of the stack so as to form a solid stack section of substantially triangular, stepped cross-section in a plane parallel to said edge with part of each terminal portion exposed, each substrate having an electrical circuit disposed on a planar surface thereof with a portion of the circuit extending onto the exposed portions of respective terminal portions to provide electrical access to said circuits.

8. An assembly as claimed in claim 7, wherein the electrical circuit on each said substrate is electrically insulated, internally of the stack, from the circuits on the other substrates of the stack.

References Cited

UNITED STATES PATENTS

| | | | |
|---|---|---|---|
| 2,932,772 | 4/1960 | Bowman et al. | 174—68.5 X |
| 3,299,394 | 1/1967 | Prescott | 339—176 |
| 3,316,618 | 5/1967 | Guarracini | 174—68.5 X |
| 3,316,619 | 5/1967 | Beelitz | 174—68.5 X |

FOREIGN PATENTS

| | | |
|---|---|---|
| 948,391 | 2/1964 | Great Britain. |
| 983,846 | 2/1965 | Great Britain. |

RICHARD E. MOORE, *Primary Examiner.*

U.S. Cl. X.R.

174—68.5; 339—176